United States Patent Office 3,549,631
Patented Dec. 22, 1970

3,549,631
3,6 - DISUBSTITUTED - PYRIDO[3,2-e] - TRIAZINES AND 3,6 - DISUBSTITUTED - 1,2 - DIHYDROPYR-IDO[3,2-e]-TRIAZINES
Benjamin Arthur Lewis, Suffern, and Robert Gordon Shepherd, South Nyack, N.Y., assignors to American Cyanamid Company, Stamford, Conn., a corporation of Maine
No Drawing. Filed Sept. 27, 1968, Ser. No. 763,376
Int. Cl. C07d 57/04
U.S. Cl. 260—249.5                10 Claims

ABSTRACT OF THE DISCLOSURE

This disclosure describes compounds of the class of 3,6-disubstituted - pyrido[3,2-e]-as-triazines and 3,6-disubstituted-1,2-dihydropyrido [3,2-e]-as-triazines useful as antibacterial, antifungal, analgesic and anti-inflammatory agents.

BRIEF SUMMARY OF THE INVENTION

This invention relates to new organic compounds and, more particularly, is concerned with novel 3,6-disubstituted-pyrido[3,2-e]-as-triazines and 3,6-disubstituted-1,2-dihydro-pyrido [3,2-e]-as triazines and with methods of preparing these compounds. The novel compounds of the present invention may be represented by the following general formulae:

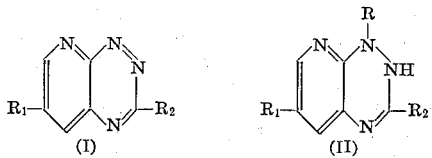

wherein R is hydrogen or lower alkyl, $R_1$ is hydrogen, halogen, carboxy or lower carboalkoxy and $R_2$ is hydrogen, lower alkyl or lower carboalkoxy. Lower alkyl groups contemplated by the present invention are those having from 1 to 4 carbon atoms such as, for example, methyl, ethyl, n-propyl, isopropyl, n-butyl, etc. Suitable lower carboalkoxy groups are those having from 1 to 5 carbon atoms such as, for example, carbomethoxy, carbethoxy, carboisopropoxy, etc. Halogen is exemplified by chloro and bromo. Typical compounds of the present invention represented by the above general formulae are, for example, 3-n-butylpyrido[3,2-e]-as-triazine, 6-bromopyrido[3,2-e]-as-triazine, 6-carbethoxyprido[3,2-e]-as-triazine, 3-ethyl-6-carboxypyrido[3,2-e]-as-triazine, 3-carbomethoxy-6-bromopyrido[3,2-e] - as-triazine, 3 - carbomethoxy-6-carbethoxypyrido[3,2-e]-as-triazine, 6-bromo-1,2 - dihydropyrido[3,2-e]-as-triazine, 3-ethyl-6-carboxy-1,2-dihydropyrido[3,2-e]-as-triazine, 3-isopropyl-6-carbethoxy-1,2-dihydropyrido[3,2 - e]-as-triazine, 3 - carbomethoxy-6-bromo-1,2-dihydropyrido[3,2-e]-as-triazine, 3-carboisopropoxy-6-chloro-1,2 - dihydropyrido[3,2-e]-as-triazine, 1-n-butyl-1,2-dihydropyrido[3,2-e]-as-triazine, 1-ethyl-6-chloro-1,2-dihydropyrido - [3,2-e]-as-triazine, 1-ethyl-3-carboisopropoxy - 1,2-dihydropyrido[3,2-e]-as-triazine, 1-ethyl-3-carbomethoxy-6-bromo - 1,2-dihydropyrido[3,2-e]-as-triazine, 1,3-dimethyl-6-carbethoxy - 1,2-dihydropyrido[3,2-e] - as-triazine and 1-isopropyl-3-carbomethoxy-6-carbethoxy-1,2-dihydropyrido[3,2-e] - as-triazine.

DETAILED DESCRIPTION OF THE INVENTION

The novel compounds of the present invention form nontoxic acid-addition salts with a variety of organic and inorganic salt-forming reagents. Thus, acid-addition salts, formed by admixture of the organic free base with an acid, suitably in a neutral solvent, are formed with such acids as sulfuric, phosphoric hydrochloric, hydrobromic, sulfamic, citric, lactic, malic, succinic, tartaric, acetic, benzoic, gluconic, ascorbic, and related acids. For purposes of this invention, the free bases are equivalent to their non-toxic acid-addition salts.

The novel compounds of the present invention are generally obtainable as yellow or orange crystalline materials having characteristic melting points and absorption spectra and which may be purified by recrystallization from common organic solvents such as n-heptane, benzene, and ethyl acetate. They are appreciably soluble in many organic solvents such as methanol, ethanol, acetone, chloroform, and the like but are relatively insoluble in water. The acid-addition salts of the organic free bases of this invention are, in general, crystalline solids relatively soluble in water, methanol and ethanol but relatively insoluble in non-polar organic solvents such as diethyl ether, benzene, toluene, and the like.

The novel 3,6-disubstituted-1,2 - dihydropyrido[3,2-e]-as-triazines (II) of the present invention may be readily prepared from an appropriately 5-substituted-3-nitro-2-halopyridine (III) as illustrated in the following reaction scheme:

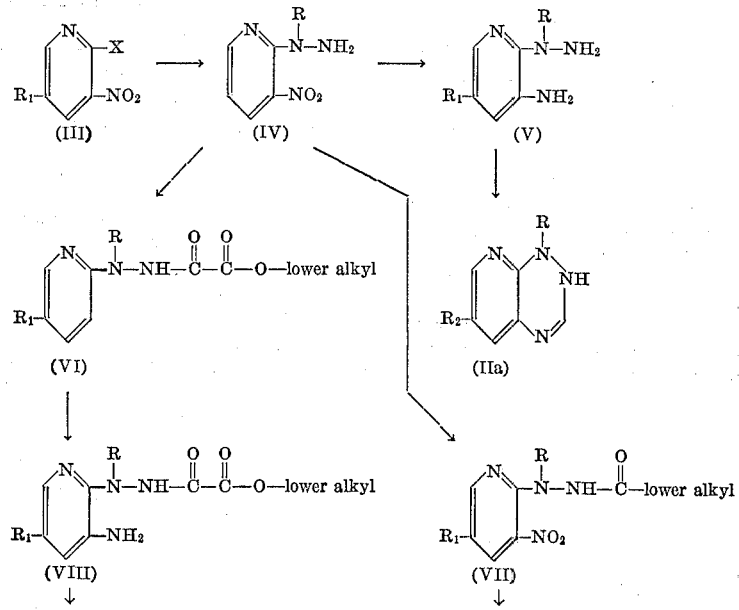

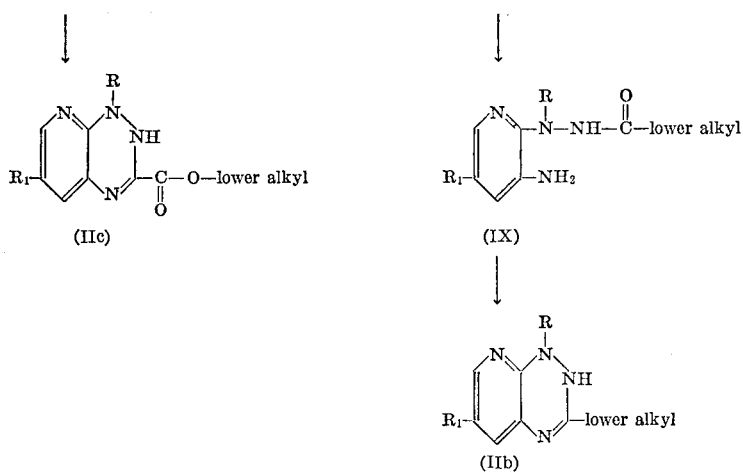

wherein X is chloro or bromo and R, $R_1$ and lower alkyl are as hereinabove defined. In accordance with the above reaction scheme, an appropriately 5-substituted-3-nitro-2-halopyridine (III) is treated with hydrazine hydrate or a mono(lower alkyl) hydrazine to provide the corresponding 5-substituted-3-nitro-2-hydrazinopyridine (IV). This reaction is best carried out in ethanol as solvent at room temperature (25° C.) for a period of time of from about 15 minutes to 3 hours or more. The product (IV) may be extracted from the water diluted reaction mixture with chloroform and purified by recrystallization from ethanol. Catalytic hydrogenation of the 5-substituted-3-nitro-2-hydrazinopyridine (IV) with 10% palladium-on-carbon in ethanol at room temperature (25° C.) and about 30–35 p.s.i. hydrogen pressure for a period of time of from about 5 minutes to half an hour affords the corresponding 5-substituted-3-amino-2-hydrazinopyridine (V). Removal of the catalyst by filtration and concentration of the filtrate gives the crude product (V) which may be purified by recrystallization from benzene. Cyclization of the 5-substituted-3-amino-2-hydrazinopyridine (V) with triethyl orthoformate and concentrated hydrochloric acid at room temperature (25° C.) for a period of time of about 1–2 hours affords the 6-substituted-1,2-dihydropyrido[3,2-e]-as-triazine (IIa). This product (IIa) precipitates from the reaction mixture and may be collected by filtration and recrcystallized from ethanol.

Acylation of an appropriately 5-substituted-3-nitro-2-hydrazinopyridine (IV) with a lower alkanoic acid anhydride

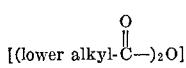

affords the corresponding 5-substituted-3-nitro-2-(2-acylhydrazino)pyridine (VII). This reaction is best carried out in an excess of the anhydride as solvent at room temperature (25° C.) for a period of time of about one hour or more. The product (VII) may be extracted from the water diluted reaction mixture with chloroform and purified by recrystallization from benzene. Catalytic hydrogenation of the 5-substituted-3-nitro-2-(2-acylhydrazino)pyridine (VII) with 10% palladium-on-carbon in ethanol at room temperature (25° C.) and about 25–35 p.s.i. hydrogen pressure for a period of time of from about 5 minutes to half an hour affords the corresponding 5-substituted-3-amino-2-(2-acylhydrazino)pyridine (IX). Removal of the catalyst by filtration and concentration of the filtrate gives the crude product (IX) which may be purified by recrystallization from chloroform. Cyclization of the 5 - substituted-3-amino-2-(2 - acylhydrazino)pyridine (IX) in 6 N ethanolic hydrogen chloride at room temperature (25° C.) for a period of time of about 5 minutes or so affords the 6-substituted-3-lower alkyl-1,2-dihydropyrido[3,2-e]-as-triazine (IIb). This product (IIb) may be isolated by concentration of the reaction mixture followed by recrystallization of the residue from ethanol.

Acylation of an appropriately 5-substituted-3-nitro-2-hydrazinopyridine (IV) with a lower alkoxalyl halide

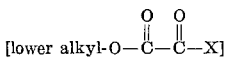

affords the corresponding 5-substituted-3-nitro-2-(2-alkoxalylhydrazino)pyridine (VI). This reaction is best carried out in chloroform as solvent and in the presence of an equimolar amount of a base such as triethylamine at room temperature (25° C.) for a period of time of about one hour or more. Concentration of the reaction mixture, after washing with water, and recrystallization of the residue from benzene gives the purified product (VI). Catalytic hydrogenation of the 5-substituted-3-nitro-2-(2-alkoxalylhydrazino)pyridine (VI) with 10% palladium-on-carbon in ethanol at room temperature (25° C.) and about 25–35 p.s.i. hydrogen pressure for a period of time of from about 5 minutes to half an hour affords the corresponding 5 - substituted - 3 - amino - 2 - (2 - alkoxalylhydrazino) pyridine (VIII). Removal of the catalyst by filtration and concentration of the filtrate gives the crude product (VIII) which may be purified by recrystallization from benzene. Cyclization of the 5-substituted-3-amino-2-(2-alkoxalylhydrazino)pyridine (VIII) in 6 N ethanolic hydrogen chloride at room temperature (25° C.) for a period of time of about 5 minutes or so gives the 6-substituted-3-lower carboalkoxy-1,2-dihydropyrido[3,2-e] - as - triazine (IIc). This product (IIc) may be isolated by concentration of the reaction mixture followed by recrystallization of the residue from ethanol.

In the above reaction scheme, when $R_1$ is carboxy it is sometimes preferable to prepare the 6-lower carboalkoxy derivative of IIa, IIb or IIc and then to hydrolyze the ester with KOH in aqueous methanol at room temperature (25° C.) for a period of time of about 12–18 hours whereby the 6-carboxy derivative of IIa, IIb or IIc is obtained.

The novel 3,6-disubstituted-pyrido[3,2-e] - as - triazines (I) of the present invention may be readily prepared by the oxidation of the corresponding 3,6-disubstituted-1,2-dihydropyrido[3,2-e]-as-triazines (X) as set forth in the following reaction scheme:

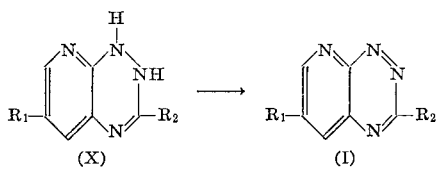

wherein $R_1$ and $R_2$ are as hereinabove defined. This oxidation reaction is carried out with ferricyanide ions in dilute aqueous ammonium hydroxide at room temperature for a period of time of a few minutes. The product (I) may be extracted from the reaction mixture with chloroform and purified by recrystallization from benzene.

The novel compounds of the present invention are useful as antibacterial and antifungal agents and possess broad-spectrum antibacterial and antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. A second set of agar dilutions is prepared identical to the first except that the nutrient agar is designed to support the growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria and yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial or fungal growth is noted. Appropriate calibration of these observations permits the quantitative calculation of the minimal inhibitory concentration (expressed in micrograms per milliliter) causing complete inhibition of growth for each test compound.

The standard laboratory microorganisms employed in the above-described assay were the following:

Bacteria (1) *Mycobacterium smegmatis* ATCC 607
(2) *Staphyloccoccus aureus* ATCC 6538P
(3) *Streptococcus faecalis* ATCC 8043
(4) *Bacillsu subtilis* ATCC 6638
(5) *Pseudomonas aeruginosa* ATCC 10145
(6) *Proteus vulgaris* ATCC 9484
(7) *Escherichia coli* ATCC 9637
(8) *Salmonella gallinarium* Lederle 604
(9) *Clostridium sporogenes* ATCC 7955

Fungi

(10) *Candida albicans* Bergen strain E3
(11) *Candida mycoderma* ATCC 9888
(12) *Saccharomyces cerevisiae* ATCC 4100
(13) *Mucor ramannianus* M-143
(14) *Fusarium epishaeria* F-105
(15) *Hormodendrum cladosporoides* Z-516
(16) *Trichophyton mentagrophytes* E-11
(17) *Microsporum gypseum* E-28
(18) *Penicillium digitatum* P-308B
(19) *Memnoniella echinata* Z-583
(20) *Chaetomium globosum* H-71
(21) *Aspergillus fumigatus* S-246

In a representative operation, and merely by way of illustration, the minimal inhibitory concentration of sixteen typical compounds of this invention against the above test organisms as determined in the above-described assay are set forth in Tables I and II below:

TABLE I.—IN VITRO ANTIBACTERIAL ACTIVITIES MINIMAL INHIBITORY CONCENTRATION (mcg./ml.)

| Compound | Bacteria | | | | | | | | |
|---|---|---|---|---|---|---|---|---|---|
|  | 1 | 2 | 3 | 4 | 5 | 6 | 7 | 8 | 9 |
| 6-chloro-1,2-dihydropyrido[3,2-e]-as-triazine hydrochloride | 15 | 125 | 500 | 8 | 125 | 8 | 125 | 62 | 500 |
| 6-chloropyrido[3,2-e]-as-triazine | 31 | 62 | 250 | 15 | 125 | 15 | 62 | 62 | >1,000i |
| 6-chloro-3-methylpyrido[3,2-e]-as-triazine | 62 | 125 | 500 | 31 | 500 | 62 | 125 | 62 | 500 |
| 6-chloro-1,2-dihydro-3-methylpyrido[3,2-e]-as-triazine hydrochloride | 62 | 125 | 500 | 31 | 250 | 125 | 125 | 62 | 250 |
| 6-carbomethyxy-3-methylpyrido[3,2-e]-as-triazine | 250 | 250 | 250 | 31 | >1,000i | 250 | 1,000 | 500 | 1,000 |
| 6-carbomethoxy-1,2-dihydropyrido[3,2-e]-as-triazine hydrochloride | 125 | 62 | 250 | 62 | >250i | 250 | >250i | 250 | >250i |
| 6-carbomethoxypyrido[3,2-e]-as-triazine | 125 | 125 | >125i | 31 | >250i | 250 | >250i | >250i | >250i |
| 1,2-dihydro-1,3-dimethylpyrido[3,2-e]-as-triazine hydrochloride | 125 | 125 | 250 | 125 | 125 | 125 | 125 | 125 | 250 |
| 1,2-dihydro-3-methylpyrido[3,2-e]-as-triazine dihydrochloride | 125 | 250 | 350 | >1,000i | 250 | 250 | 250 | 125 | >1,000i |
| 3-methylpyrido[3,2-e]-as-triazine | 125 | 250p | >1,000i | 125 | 250p | 250 | 125p | 250 | 250 |
| 1,2-dihydro-1-methylpyrido[3,2-e]-as-triazine hydrochloride | 62 | 125 | 250 | 31 | 125 | 31 | 125 | 62 | >1,000i |
| Pyrido[3,2-e]-as-triazine | 16 | 1,000 | 1,000 | 31 | 250 | 31 | 500 | 16 | 500 |
| 1,2-dihydropyrido[3,2-e]-as-triazine dihydrochloride | 125 | 250 | 1,000 | 31 | 125 | 125 | 500 | 125 | >1,000i |
| 6-carbomethoxy-1,2-dihydro-3-methylpyrido[3,2-e]-as-triazine hydrochloride | 250 | 500 | 500 | 62 | 1,000 | 250 | 1,000 | 500 | >1,000i |
| Pyrido[3,2-e]-as-triazine-6-carboxylic acid | >250i | >250i | >250i | >250i | >250i | >250i | >250i | >250i | >250i |
| 3-methylpyrido[3,2-e]-as-triazine-6-carboxylic acid | >250i | >250i | >250i | >250i | >250i | >250i | >250i | >250i | >250i |

TABLE II.—IN VITRO ANTIFUNGAL ACTIVITIES MINIMAL INHIBITORY CONCENTRATION (mcg./ml.)

| Compound | Fungi | | | | | | | | | | | |
|---|---|---|---|---|---|---|---|---|---|---|---|---|
|  | 10 | 11 | 12 | 13 | 14 | 15 | 16 | 17 | 18 | 19 | 20 | 21 |
| 6-chloro-1,2-dihydropyrido[3,2-e]-as-triazine hydrochloride | 62 | 62 | 15 | 31 | 62 | 15 | 2 | 4 | 4 | 4 | 4 | 62 |
| 6-chloropyrido[3,2-e]-as-triazine | 15 | 31 | 15 | 15 | 8 | 8 | 2 | 2 | 4 | 8 | 2 | 31 |
| 6-chloro-3-methylpyrido[3,2-e]-as-triazine | 125 | 15 | 31 | 31 | 31 | 15 | 4 | 4 | 8 | 15 | 15 | 15 |
| 6-chloro-1,2-dihydro-3-methylpyrido[3,2-e]-as-triazine hydrochloride | 125 | 15 | 15 | 31 | 15 | 8 | 4 | 4 | 4 | 15 | 15 | 15 |
| 6-carbomethoxy-3-methylpyrido[3,2-e]-as-triazine | 250 | 500 | 125 | 125 | 250 | 500 | 31 | 31 | 500 | 250 | 31 | 500 |
| 6-carbomethoxy-1,2-dihydropyrido[3,2-e]-as-triazine hydrochloride | 250 | 250 | 125 | 250 | 125 | 125 | 62 | 62 | 250 | 125 | 62 | >250i |
| 6-carbomethoxypyrido[3,2-e]-as-triazine | 250 | 250 | 125 | 125 | 125 | 125 | 62 | 62 | 125 | 125 | 62 | >250i |
| 1,2-dihydro-1,3-dimethylpyrido[3,2-e]-as-triazine hydrochloride | 125 | 125 | 125 | 125 | 62 | 62 | 31 | 31 | 62 | 125 | 31 | 125 |
| 1,2-dihydro-3-methylpyrido[3,2-e]-as-triazine dihydrochloride | 125 | 125 | 125 | 250 | >1,000i | 125 | 16 | 16 | 62 | 62 | 62 | 62 |
| 3-methylpyrido[3,2-e]-as-triazine | 125 | 125 | 125 | 125 | 62 | 31 | 8 | 8 | 16 | 125 | 31 | 62 |
| 1,2-dihydro-1-methylpyrido[3,2-e]-as-triazine hydrochloride | 62 | 62 | 31 | 62 | 62 | 62 | 31 | 31 | 62 | 62 | 31 | 62 |
| Pyrido[3,2-e]-as-triazine | 31 | 31 | 31 | 125 | 8 | 8 | 1 | 1 | 8 | 8 | 8 | 31 |
| 1,2-dihydropyrido[3,2-e]as-triazine dihydrochloride | 250 | 250 | 125 | 125 | 31 | 62 | 4 | 4 | 31 | 31 | 31 | 125 |
| 6-carbomethoxy-1,2-dihydro-3-methylpyrido[3,2-e]-as-triazine hydrochloride | 125 | 250 | 125 | 250 | 125 | 250 | 31 | 62 | 500 | 250 | 250 | 500 |
| Pyrido[3,2-e]-as-triazine-6-carboxylic acid | >250i | >250i | >250i | >250i | >250i | >250i | >250i | >250i | >250i | >250i | >250i | >250i |
| 3-methylpyrido[3,2-e]-as-triazine-6-carboxylic acid | >250i | >250i | >250i | >250i | >250i | >250i | >250i | >250i | >250i | >250i | >250i | >250i |

The novel compounds of the present invention are also useful as analgesic and anti-inflammatory agents. The analgesic and anti-inflammatory activity of the compounds of the invention have been determined using four different controlled animal tests as follows:

(1) Anti-writhing phenyl-p-quinone test.—The method is based upon the reduction of the number of writhes following the intraperitoneal injection of 1 milligram per kilogram of body weight of phenyl-p-quinone (PPQ) in male Swiss albino mice obtained weekly from Manor Farms, the mice weighing 15–25 grams per mouse at the time of use. The syndrome is characterized by intermittent contractions of the abdomen, twisting and turning of the trunk and extension of the hind legs beginning 3 to 5 minutes after injection. Control mice show the syndrome continuously for more than 30 minutes. A compound is considered active if it reduces the total number of writhes in 2 test mice from an historical control value of approximately 30 per pair to a value of 18 or less (counted for a 3 minute period of time, 15 minutes after injection of PPQ). The test is repeated, using 2 more mice. The compound is considered inactive if the number of writhes per pair exceeds 18 in either test. The compound is considered active if the number of writhes per pair is 18 or less in both tests.

(2) Rat tail radiant heat response.—A radiant heat procedure has been utilized for the detection of narcotic analgesic activity (morphine-type) and narcotic-antagonistic activity (nalorphine-type). The method does not detect non-narcotic analgesic action (aspirin-like). Rats used for the radiant heat procedure were male albinos of the Wistar strain obtained from Royal Hart Farms and weighed 90–180 grams. Briefly, a beam of light is focused on the blackened tip (India ink) of a rat's tail. The time required for the rat to remove (flick) its tail away from the stimulus within 15 seconds is measured. The response time of each rat was determined 30 and 60 minutes after treatment and an average calculated. All compounds were administered intraperitoneally in a volume of 0.5 milliliter per 100 grams of body weight followed immediately by the subcutaneous injection of 4.5 milligrams per kilogram of morphine sulfate. This dose of morphine has been calculated to give an average response time of 10 seconds. An average response time of 14–15 seconds for rats treated with morphine plus a test compound indicates enhancement of the analgesic effect of morphine. An average response time of less than 8 seconds indicates antagonism of the action of morphine.

(3) Brewers' yeast inflamed rat paw pressure-pain threshold.—The use of brewers' yeast as an inflammatory agent to increase the sensitivity of the hind paws of rats is useful in demonstrating analgesic activity of the non-narcotic type (e.g., aspirin, indomethacin). The procedure also responds to narcotics and some narcotic antagonists. Pressure is applied to the plantar surface of the rat's hind paw which has been inflamed with 0.1 milliliter of a 20% brewers' yeast suspension. The pressure required for the rat to characteristically struggle and/or vocalize is measured in millimeters of mercury (pressure-pain response). Control rats (no drug) respond at about 100 millimeters of mercury pressure.

(4) Carrageenin-induced rat paw edema—Procedure A.—The reduction of carrageenin-produced edema appears to be an accurate and reliable means of determining whether an agent is producing an analgesic or anti-inflammatory effect or both. The method responds well to agents of the non-narcotic type (aspirin, indomethacin, phenylbutazone) and also to anti-inflammatory agents of the non-analgesic type (hydrocortisone). The procedure does not detect narcotic analgesics or narcotic antagonists. Briefly, inflammation is determined by comparing the amount of water displaced by the swollen paw to the amount which would be displaced by a normal paw. Reduction of edema is determined by comparing the volume of the inflamed paw of drug-dosed animals to that of a starch-dosed historical control group of animals. The critical values are based upon a 2-stage (5+5 rat) sequential procedure. If the mean difference for two groups of five rats is 0.131 milliliter, the compound is considered active in reducing carrageenin-produced edema. The test is repeated in another 2-stage (5+5 rat) procedure before the agent is accepted by the method.

In a representative operation, and merely by way of illustration, the results obtained with five typical compounds of the present invention in the four tests described hereinabove are set forth in Table III below.

TABLE III.—ANALGESIC TESTING

| | | Test 2 (rat tail radiant heat interaction with morphine) | | | Inflamed rat paw | | |
| | Test 1 (mouse anti-writhing) | | | | Test 3 (brewers' yeast pressure-pain threshold) | | Test 4 (carrogeenin anti-edema) |
| | | Decisions | | | | Percent over control | | Ml. diff. from control |
| Compound | Decision | Oral dose, mg./kg. | Enhanc. (mg./kg. i.p.) | Antag. (mg./kg. i.p.) | ED Antag. (mg./kg. s.c.) | Decision | (mg./kg. p.o.) | Decision | (mg./kg. p.o.) |
|---|---|---|---|---|---|---|---|---|---|
| Pyrido[3,2-e]-as-triazine | A | 100 | I (25) | A (25) | 5 | I | 13 (50) | A | 0.326 (50) |
| 1,2-dihydropyrido[3,2-e]-as-triazine dihydrochloride | A | 50 | I (25) | A (25) | 50 | I | 5 (100) | A | 0.380 (100) |
| 6-carbomethoxy-1,2-dihydro-3-methylpyrido[3,2-e]-as-triazine hydrochloride | A | 100 | I (50) | I (50) | | I | 0 (200) | A | 0.356 (100) |
| 6-chloropyrido[3,2-e]-as-triazine | A | 100 | I (50) | I (50) | | I | 3 (200) | A | 0.524 (200) |
| 6-carbomethoxy-1,2-dihydropyrido[3,2-e]-as-triazine hydrochloride | A | 200 | I (50) | I (50) | | I | 24 (200) | | |

NOTE: A=Active; I=Inactive.

In addition, compounds of this invention have shown anti-inflammatory activities when tested by the three additional procedures described hereinbelow. The ultraviolet-induced erythema test and the yeast-induced pyrexia test and the statistical criteria derived using statistical techniques are described in a report by C. W. Dunnett and R. A. Lamm, "Sequential Procedure for Drug Screening," presented at the September 1962 meeting of the American Statistical Association. The procedures are as follows:

(5) Carrageenin-induced rat paw edema—Procedure B.—In this test weanling Sherman strain rats ranging in weight from 50–55 grams are used and fed standard laboratory diet ad libitum. The test compound is administered to the rats by gavage (250 milligrams per kilogram in a volume of 1.7 milliliters of buffered aqueous starch) one hour prior to challenge with carrageenin. The challenge agent, carrageenin, is obtained from Marine Colloids, 2 Edison Place, Springfield, N.J. and prepared as a sterile 1% suspension in 0.09% aqueous sodium chloride. A volume of 0.05 milliliter is injected using a 26-gauge needle into the plantar tissue of the right hind paw of treated and untreated rats. Measurements of the volumes of the carrageenin inflamed right (challenged) paw and left (unchallenged) paw are determined 4 hours subsequent to the carrageenin challenge. The method of determining paw volumes is carried out essentially as described by C. A. Winter et al., in Proc. Soc. Exptl. Biol. Med. 111: 554–547 (1962) using mercury immersion. The differences in volume between the two paws of each rat is considered to be the volume of the carrageenin induced edema. The mean edema volume of eight control rats divided by the mean edema volume of two treated rats is calculated and designated the C/T efficacy ratio. A compound is considered active in this test if the mean C/T efficacy ratio of 2 consecutive tests is equal to or greater than 1.43.

(6) Rat ear ultraviolet-induced erythema.—Test compounds are administered orally to groups of 3 rats each (Sherman strain rats, weighing 50+5 grams each) in dosages of 250 milligrams per kilogram of body weight in a 2% acacia vehicle. One hour after administration of the compounds, the treated rats and control rats are subjected to dermal ultraviolet irradiation of the right ear for 90 seconds with a 550 watt Hanovia lamp. At two hours post-irradiation, the irradiated sites of both test and control rats are visually graded as to the degree of induced erythema on a scale of 0 to 4.0 where 0 represents a minimum degree of erythema and 4.0 represents a maximum degree of erythema. The averaged numerical value of each group is then appropriately inserted into the ratio of control rats to treated rats, abbreviated C/T. The test is designed in three sequential stages, so that an acceptable compound requires three testing stages, although one, two or three stages may be required for rejection. Those test compounds are judged active in which the geometric mean of the C/T values of rats observed is above 1.20 at stage one, above 1.63 at stage two, and above 2.20 at stage three, and at which latter point a compound is accepted as an active anti-inflammatory agent. If at any stage the geometric means of the C/T values is below the above-mentioned critical values, the compound is rejected as being inactive.

(7) Yeast-induced pyrexia in rats.—To groups of three Sherman strain rats, weight 55±5 grams each are administered subcutaneously in the napes of the necks, 0.6 milliliter of a 40% suspension of dried yeast in distilled water. Each test compound is then administered orally at a dosage of 250 milligrams per kilogram in a 2% acacia vehicle at seventeen hours post-challenge. Control rats are treated in a similar manner but are not given the test compounds. At nineteen hours post-challenge the rectal temperature of each rat is recorded. The averaged numerical temperature for each group is then appropriately inserted into the relationship of control rats minus treated rats, abbreviated C–T. The test is designed in three sequential states, so that an acceptable compound requires three testing stages although one, two or three stages may be required for rejection. Those test compounds are judged active in which the C–T value is above 0.44 at stage one, and the averaged C–T value of both runs is above 0.55 at stage two, and the averaged C–T value of three runs is above 0.61 at stage three, at which latter point the compound is accepted as an active anti-pyretic agent. If at any stage the average of the C–T values is below the above mentioned critical values, the compound is rejected as being inactive.

In a representative operation, and merely by way of illustration, the results obtained with six typical compounds of the present invention in Tests 5, 6 and 7 described hereinabove are set forth in Table IV below.

As antibacterials or antifungals, compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspensions, syrups, elixirs, etc., in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive bacteria or fungi for either treatment or prophylaxis and may include, in addition to the foregoing, ointments, creams, emulsions, unguents, salves, emollients, sprays, washes or the like. In addition, compounds of this invention may be used in the form of solutions, suspensions, emulsions, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive bacteria or fungi. Painting, spraying, immersion or other means of effecting contact may be applied. As analgesics or anti-inflammatory agents, compounds of this invention may be used in any of the pharmaceutical forms or modes accepted in the pharmaceutical art, such as suggested hereinabove.

The invention will be described in greater detail in conjunction with the following specific examples.

EXAMPLE 1

Preparation of 2-(1-methylhydrazino)-3-nitropyridine

Methylhydrazine (18.4 g., 0.4 mole) was added dropwise to a partial solution of 2-chloro-3-nitropyridine (31.7 g., 0.2 mole) in ethanol (200 ml.). The mixture became red, and the starting material was taken into solution as the reaction proceeded. After 3 hours, the solution was evaporated under reduced pressure. The residue was stirred with water (250 ml.) and made just alkaline with sodium hydroxide solution (2 N). The mixture was extracted with chloroform (5 × 100 ml.) and the combined chloroform layers were washed once with water (100 ml.), dried over anhydrous magnesium sulphate and evaporated under reduced pressure. The solid residue was recrystallized from ethanol (200 ml.) to give orange prisms, 28.2 g. (84%) M.P. 59.5–60.5° C. A sample for analysis was recrystallized from ethanol to give orange prisms M.P. 60–60.5 C.

TABLE IV.—ANTI-INFLAMMATORY TESTING

| Compound | Test 5, Carrageenin-induced rat paw edema-procedure B | | Test 6, Rat ear ultraviolet-induced erythema | | Test 7, Yeast-induced pyrexia in rats | | |
|---|---|---|---|---|---|---|---|
| | Dose, mg./kg. | Mean C/T ratio (4 rats) | Dose, mg./kg. | Mean C/T ratio (9 rats) | Dose, mg./kg. | Temp., C–T | No. rats |
| 1,2-dihydro-1,3-dimethylpyrido[3,2-e]-as-triazine hydrochloride | 250 | 1.61 | 250 | 2.07 | 83 | 3.35 | 6 |
| 1,2-dihydro-3-methylpyrido[3,2-e]-as-triazine dihydrochloride | 250 | 2.02 | | | | | |
| 1,2-dihydro-1-methylpyrido[3,2-e]-as-triazine hydrochloride | 250 | 1.45 | 250 | 6.85 | 83 | 2.75 | 6 |
| pyrido[3,2-e]-as-triazine | 60 | 2.05 | 60 | 7.87 | 83 | 4.95 | 6 |
| 1,2-dihydropyrido[3,2-e]-as-triazine dihydrochloride | 250 | 1.94 | | | 83 | 4.85 | 6 |
| 6-carbomethoxy-1,2-dihydro-3-methylpyrido[3,2-e]-as-triazine hydrochloride | 250 | 1.86 | | | | | |

EXAMPLE 2

Preparation of 2-(2-acetyl-1-methylhydrazino)-3-nitropyridine 2-(1-methylhydrazino)-3-nitropyridine (10.1 g., 0.06 mole) was added to acetic anhydride (50 ml.) at 5° C., with stirring. After stirring for 1 hour at room temperature the mixture was poured into water (500 ml.) and made just basic by the addition of 2 N sodium hydroxide. A deep red color appeared and one drop of 2 N hydrochloric acid was added to turn the solution yellow again. The mixture was extracted with chloroform (5 × 100 ml.) and the combined chloroform extracts were washed once with water (100 ml.), dried over anhydrous magnesium sulphate, and evaporated under reduced pressure. The yellow crystalline solid was dissolved in 500 ml. benzene, treated with 100 mg. Darco G–60, and filtered. The filtrate was concentrated to about 75 ml. and stored at room temperature. The yellow prisms were isolated by filtration and dried, 8.80 g. (70%) M.P. 155–156° C. A sample recrystallized from benzene for analysis had the same melting point.

EXAMPLE 3

Preparation of 2-(2-acetyl-1-methylhydrazino)-3-aminopyridine

10% palladium-on-carbon (200 mg.) was added to a solution of 2-(2-acetyl-1-methylhydrazino)-3-nitropyridine (0.70 g., 0.0033 mole) in ethanol (100 ml.). The mixture was shaken under hydrogen at 31.6 p.s.i. in a Parr hydrogenator. After 5 minutes the theoretical amount of hydrogen had been absorbed (9.6 p.s.i.) and the reduction was discontinued. The solution was filtered to remove the catalyst, and the filtrate evaporated under reduced pressure. The residue was recrystallized from benzene using Darco G–60 (100 mg.) to give fine ivory needles, 0.43 g., M.P. 128–129° C. A portion of the product was recrystallized from benzene to give ivory needles, M.P. 128–129° C.

EXAMPLE 4

Preparation of 1,2-dihydro-1,3-dimethylpyrido[3,2-e]-as-triazine hydrochloride

Ethanolic hydrogen chloride (6 N, 5 ml.) was added to a solution of 2-(2-acetyl-1-methylhydrazino)-3-aminopyridine (0.18 g., 0.001 mole) in absolute ethanol (5 ml.). The solution became bright yellow, and it was evaporated to dryness under reduced pressure. The residue was recrystallized from ethanol to give fine yellow crystals 0.17 g., M.P. 270° C. (dec.), with extensive decomposition occurring above about 230° C.

EXAMPLE 5

Preparation of 2-hydrazino-3-nitropyridine

Hydrazine hydrate (20 g., 0.4 mole) was added dropwise over 30 minutes to a stirred partial solution of 2-chloro-3-nitropyridine (31.7 g., 0.2 mole) in ethanol (200 ml.). A red solid was precipitated during the addition. After the addition was complete the precipitate was isolated by filtration, and the filtrate evaporated to dryness under reduced pressure. The residue and the precipitate were combined and stirred with water (250 ml.). Sodium hydroxide solution (2 N) was added until the mixture was just alkaline. The mixture was extracted with chloroform (5 × 100 ml.) and the combined chloroform layers were washed once with water (100 ml.), dried over anhydrous magnesium sulphate, and evaporated under reduced pressure. The solid residue was recrystallized from ethanol (2 l.) to give orange needles, 24.9 g. (81%) M.P. 170–171° C. A sample for analysis was recrystallized from ethanol to give orange needles, M.P. 171–171.5° C.

EXAMPLE 6

Preparation of 2-(2-acetylhydrazino)-3-nitropyridine 2-hydrazino-3-nitropyridine (10.78 g., 0.07 mole) was added to acetic anhydride (10 ml.) at 5° C., and stirred at room temperature for one hour. The reaction mixture was poured into water (500 ml.) and made just basic by the addition of 2 N sodium hydroxide. A deep purple colour appeared and one drop of 2 N hydrochloric acid was added to turn the solution yellow again. The mixture was extracted with chloroform (5 × 100 ml.) and the combined chloroform extracts were washed once with water (100 ml.), dried over anhydrous magnesium sulphate, and evaporated under reduced pressure. The deep red solid was dissolved in 500 ml. benzene, treated with 100 mg. Darco G–60 and filtered. The filtrate was concentrated to about 100 ml. and stored at room temperature. The lustrous red plates were isolated by filtration and dried, 8.92 g. (65%). On heating, the red solid changed to an orange solid at about 120° C. without melting, heating was continued and the orange solid melted at 157–8° C.

EXAMPLE 7

Preparation of 2-(2-acetylhydrazino-3-aminopyridine

10% palladium-on-carbon (2.0 g.) was added to a solution of 2-(2-acetylhydrazino)-3)-nitropyridine (7.84 g., 0.04 mole) in ethanol (100 ml.). The mixture was shaken under hydrogen at 35 p.s.i. in a Parr hydrogenator. After 10 minutes the theoretical amount of hydrogen had been absorbed (10.2 p.s.i) and the reduction was discontinued. The solution was filtered to remove the catalyst, and the filtrate evaporated under reduced pressure. The residue was recrystallized from chloroform using Darco G–60 (100 mg.) to give small ivory crystals, 4.05 g. (61%) M.P. 153–155° C. A portion of the product was recrystallized from chloroform to give fine ivory needles M.P. 155–156° C.

EXAMPLE 8

Preparation of 1,2-dihydro-3-methylpyrido[3,2-e]-as-triazine dihydrochloride

Ethanolic hydrogen chloride (6 N, 30 ml.) was added to a solution of 2-(2-acetylhydrazino-3-aminopyridine (3.3 g., 0.02 mole) in absolute ethanol (30 ml.). The solution became bright yellow, and it was evaporated to dryness under reduced pressure. The residue was recrystallized from ethanol (30 ml.) to give an amorphous yellow solid, 2.63 g. (60%), M.P. 220° C. (dec.), with extensive decomposition beginning at about 180° C.

EXAMPLE 9

Preparation of 3-methylpyrido[3,2-e]-as-triazine

A suspension of 1,2-dihydro-3-methylpyrido[3,2-e]-as-triazine dihydrochloride (9.70 g.) in acetone (500 ml.) was stirred for 3 hours with sodium bicarbonate (20 g.). The mixture was filtered to remove the inorganic salts, evaporated to dryness under reduced pressure and the residue taken up in water (50 ml.). Ammonium hydroxide (10 ml.) was added and the solution was treated with a solution of potassium ferricyanide (25 g.) in water (100 ml.). The mixture was extracted with chloroform (5 × 100 ml.) and the combined chloroform layers washed once with water (100 ml.) and dried over anhydrous magnesium sulphate. The solvent was evaporated under reduced pressure and the residue recrystallized twice from benzene, using 100 mg. Darco G–60 in the first recrystallization, to give orange needles, 5.31 g. (82%) M.P. 171.5–172° C.

EXAMPLE 10

Preparation of 1,2-dihydro-3-methylpyrido[3,2-e]-as-triazine

A suspension of 1,2-dihydro-3-methylpyrido[3,2-e]-as-triazine dihydrochloride (2.0 g.) and sodium bicarbonate (5.0 g.) in acetone (200 ml.) were stirred together under an atmosphere of nitrogen for 3 hours. It was then filtered to remove inorganic salts, evaporated under reduced pressure, and the residue recrystallized from benzene (100 ml.) using 50 mg. Darco G–60, to give yellow crystals, 0.58 g. (43%) M.P. 158° C. (dec.), with decomposition beginning at about 130° C. A second recrystallization from benzene gave bright yellow crystals, 0.34 g. melting characteristics unchanged.

EXAMPLE 11

Preparation of 3-amino-2-(1-methylhydrazino)-pyridine

10% palladium-on-carbon (200 mg.) was added to a solution of 2-(1-methylhydrazino)-3-nitropyridine (0.56 g., 0.0033 mole) in ethanol (100 ml.). The mixture was shaken under hydrogen at 29.6 p.s.i. in a Parr hydrogenator. After 5 minutes, the theoretical amount of hydrogen had been absorbed (9.6 p.s.i.) and the reduction was discontinued. The solution was filtered to remove the catalyst, and the filtrate evaporated under reduced pressure. The residue was recrystallized from benzene using Darco G–60 (100 mg.) to give small white plates, 0.33 g. M.P. 102–103.5° C. Two recrystallizations from benzene raised the melting point to 106–106.5° C.

EXAMPLE 12

Preparation of 1,2-dihydro-1-methylpyrido[3,2-e]-as-triazine hydrochloride

To a stirred suspension of 3-amino-2-(1-methylhydrazino)-pyridine (2.76 g., 0.02 mole) in triethyl orthoformate (25 ml.) was added concentrated hydrochloric acid (1.70 ml., 0.02 mole), and stirring was continued for 2 hours at room temperature. The yellow precipitate was isolated by filtration and recrystallized from ethanol containing a little hydrochloric acid, to give a yellow amorphous solid, 2.35 g. (63%). The product darkened above 200° C. and liquified at 245° C. to give a black melt.

EXAMPLE 13

Preparation of 3-amino-2-hydrazinopyridine

10% palladium-on-carbon (1.0 g.) was added to a partial solution of 2-hydrazino-3-nitropyridine (7.70 g., 0.05 mole ) in ethanol (100 ml.). The mixture was shaken under hydrogen at 35.2 p.s.i. in a Parr hydrogenator. After 30 minutes the theoretical amount of hydrogen had been absorbed (12.7 p.s.i.) and the reduction was discontinued. The solution was filtered to remove the catalyst, and the filtrate evaporated under reduced pressure. The residue was recrystallized from benzene using Darco G–60 (100 mg.) to give white plates, 5.02 g., (81%), M.P. 111–112° C.

EXAMPLE 14

Preparation of 1,2-dihydropyrido[3,2-e]-as-triazine dihydrochloride

To a stirred suspension of 3-amino-2-hydrazinopyridine (2.48 g., 0.02 mole) in triethyl orthoformate (25 ml.) was added concentrated hydrochloric acid (3.5 ml.) in triethyl orthoformate (15 ml.) and stirring was continued for 2 hours at room temperature. The yellow precipitate that formed was isolated by filtration and washed (3×50 ml.) with ether containing about 10% 6 N ethanolic hydrogen chloride to give a pale yellow powder, 3.37 g. (81%), M.P. 180–181° C. (dec.). A small amount of the product was dissolved in hot ethanol and filtered through a pad of Celite and Darco G–60. The filtrate was concentrated and cooled and the product isolated by filtration to give the monohydrochloride as a yellow powder, M.P. 181.5–183.5° C. (dec.).

EXAMPLE 15

Preparation of pyrido[3,2-e]-as-triazine

A suspension of 1,2-dihydropyrido[3,2-e]-as-triazine dihydrochloride (5.63 g., 0.027 mole) in acetone (250 ml.) was stirred for 2 hours with sodium bicarbonate (10 g.). The mixture was filtered to remove inorganic salts, evaporated to dryness under reduced pressure, and the residue taken up in water (50 ml.). Ammonium hydroxide (10 ml.) was added and the solution was treated with a solution of potassium ferricyanide (10 g.) in water (50 ml.). The mixture was extracted with chloroform (5×50 ml.) and the combined chloroform layers washed once with water (50 ml.) and dried over anhydrous magnesium sulphate. The solvent was evaporated under reduced pressure and the residue recrystallized twice from benzene to give 3.08 g. (86%), M.P. 150.5–151.5° C.

EXAMPLE 16

Preparation of 1,2-dihydropyrido[3,2-e]-as-triazine

Ammonium hydroxide (10 ml.) was added to a solution of 1,2-dihydropyrido[3,2-e]-as-triazine dihydrochloride (1.70 g., 0.0082 mole) in water (20 ml.) and chloroform (20 ml.) and the mixture shaken vigorously. The chloroform layer was removed and the aqueous layer extracted with chloroform (4×20 ml.). The combined chloroform extracts were washed with water (50 ml.), dried over anhydrous magnesium sulphate and evaporated. The residue was recrystallized from benzene (100 ml.) using 50 mg. Darco G–60 to give yellow crystals. These were recrystallized twice from benzene to give bright yellow crystals, 0.49 g. (44%) M.P. 135° C. (dec.) to give a black melt.

EXAMPLE 17

Preparation of 5-carbomethoxy-2-hydrazino-3-nitropyridine

To a partial solution of 5-carbomethoxy-2-chloro-3-nitropyridine (4.30 g., 0.02 mole) in ethanol (200 ml.) was added dropwise with stirring, hydrazine (1.50 g., 95%+; 0.044 mole). An orange-red precipitate appeared. The mixture was stirred for 15 minutes after addition was complete, filtered and the filtrate was evaporated under reduced pressure. The precipitate and the residue from evaporation were stirred with water (200) ml. and the mixture extracted with chloroform (3×150 ml.). The combined chloroform layers were washed once with water (100 ml.) dried, and evaporated. Two recrystallizations from benzene (100 ml.) gave orange crystals, M.P. 169–170° C., 2.89 g. (68%).

EXAMPLE 18

Preparation of 2-(2-acetylhydrazino)-5-carbomethoxy-3-nitropyridine 5-carbomethoxy-2-hydrazino-3-nitropyridine (1.91 g., 0.009 mole) was added to acetic anhydride (25 ml.) with stirring; and stirring was continued for 1 hour. The mixture was poured into ice-water (250 ml.) and made almost basic by the addition of 6 N sodium hydroxide. The solution was extracted with chloroform (4×100 ml.) and the combined chloroform layers were washed once with water (100 ml.), dried and evaporated under reduced pressure. The residue was recrystallized twice from chloroform to give fluffy yellow needles, 1.54 g. (67%), M.P. 201–201.5° C.

EXAMPLE 19

Preparation of 3-amino-5-carbomethoxy-2-hydrazinopyridine

10% palladium-on-carbon (0.5 g.) was added to pyridine (2.12 g., 0.01 mole) in ethanol (100 ml.). The mixture was shaken under hydrogen in a Parr hydrogenator. After 15 minutes the theoretical amount of hydrogen had been absorbed, and the reduction discontinued. The solution was filtered to remove the catalyst, and the filtrate evaporated under reduced pressure, and the residue recrystallized from methanol using Darco G–60 (50 mg.) to give cream colored needles 1.15 g. (63%) M.P. 208–209° C. (dec.).

EXAMPLE 20

Preparation of 2-(2-acetylhydrazino)-3-amino-5-carbomethoypyridine

10% palladium-on-carbon (0.10 g.) was added to a solution of 2-(2-acetylhydrazino) - 3 - carbomethoxy-3-nitropyridine (0.82 g., 0.0033 mole) in ethanol (100 ml).

The mixture was shaken under hydrogen at 28.5 p.s.i. in a Parr hydrogenator. After 15 minutes the theoretical amount of hydrogen had been absorbed (9.0 p.s.i.) and the reduction was discontinued. The solution was filtered to remove the catalyst, and the filtrate evaporated under reduced pressure. The residue was recrystallized from methanol to give small white prisms, 0.49 g. (68%) M.P. 197–198° C. Recrystallization from methanol gave an analytical sample, M.P. 198.5–200° C.

EXAMPLE 21

Preparation of 6-carbomethoxy-1,2-dihydro-3-methyl-pyrido-[3,2-e]-as-triazine hydrochloride Methanolic hydrogen chloride (6 N, 20 ml.) was added to a solution of 2-(2-acetylhydrazino)-3-amino-5-carbomethoxypyridine (2.24 g., 0.01 mole) in methanol (100 ml.). The solution was evaporated under reduced pressure to give an orange-red solid. This was recrystallized from methanol, containing a little 6 N methanolic hydrogen chloride to give an orange-red solid. 2.32 g. (83%) M.P. 237–239° C. (dec.).

EXAMPLE 22

Preparation of 5-chloro-2-hydrazino-3-nitropyridine

To a solution of 2-bromo-5-chloro-3-nitropyridine (9.5 g., 0.04 mole) in ethanol (100 ml.) was added 95% hydrazine (2.97 g., 0.088 mole) with stirring. The solution became red and warmed up, and after some minutes a red precipitate formed. The mixture was stirred for 2 hours at room temperature, water (400 ml.) was added and the mixture extracted with 100 ml. chloroform four times. The chloroform extracts were washed once with water, dried over anhydrous magnesium sulfate, and evaporated. The residue was 7.40 g. (ca. 98%) dark red solid. This was recrystallized from benzene using ca. 50 mg. Darco, concentrated to ca. 50 ml. and allowed to cool. Lustrous red needles were obtained, filtered and dried. 6.85 g. (91%) M.P. 133–134° C.

EXAMPLE 23

Preparation of 2-amino-5-chloro-2-hydrazinopyridine

10% palladium-on-carbon (0.5 g.) was added to 5-chloro-2-hydrazino-3-nitropyridine (3.77 g., 0.02 mole) in ethanol (100 ml.) and the mixture shaken in a Parr apparatus under hydrogen until the theoretical uptake was reached (30 minutes). The mixture was removed from the apparatus, filtered and evaporated under reduced pressure. The residue was recrystallized from benzene to give white needles, 2.03 g. (64% M.P. 168–169° C. d. A sample was recrystallized twice for analysis, M.P. 168.5–169.5° C. d.

EXAMPLE 24

Preparation of 2-(2-acetylhydrazino)-3-amino-5-chloropyridine

Acetic anhydride (8.2 g., 0.08 mole) was added to a suspension of 3-amino-5-chloro-2-hydrazinopyridine (12.7 g., 0.08 mole) in ether (300 ml.). The mixture was stirred at room temperature for 1 hour and the product isolated by filtration. The product was recrystallized from chloroform containing a little ethanol to give off white needles, 11.4 g. (71%) M.P. 152–153° C. (dec.). A sample was recrystallized from the same solvent, for analysis, M.P. 153.5–154.5° C. (dec.).

EXAMPLE 25

Preparation of 6-chloro-1,2-dihydropyrido[3,2-e]-as-triazine hydrochloride

Concentrated hydrochloric acid (1.0 ml.) was added to a stirred mixture of 3-amino-5-chloro-2-hydrazinopyridine (1.58 g., 0.01 mole) in triethylorthoformate (20 ml.). The mixture was stirred for 1 hour and the product isolated by filtration as a yellow powder. The product was washed with ethanol and ether (10 ml. each) and dried in vacuo. 1.78 g. (87%) M.P. darkening above 200° C., liquifies 218° C. d.

EXAMPLE 26

Preparation of 6-chloropyrido[3,2-e]-as-triazine

Ammonium hydroxide (25 ml.) was added to a solution of 6-chloro-1,2-dihydropyrido[3,2-e]-as-triazine hydrochloride (5.13 g., 0.025 mole) in water (50 ml.). A solution of potassium ferricyanide (16.5 g., 0.05 mole) in water (100 ml.) was added immediately and the mixture extracted (4×100 ml.) with chloroform. The combined chloroform extracts were dried over anhydrous magnesium sulfate filtered and evaporated under reduced pressure. The residue was recrystallized from benzene using 100 mg. Darco G-60, to give orange prisms, 3.64 g. (87%), M.P. 124–125° C. (dec.). A sample was recrystallized from analysis from the same solvent, to give orange prisms M.P. 124.5–125.5° C. (dec.).

EXAMPLE 27

Preparation of 6-chloro-1,2-dihydro-3-methylpyrido-[3,2-e]as-triazine hydrochloride Ethanolic hydrogen chloride (6 N, 40 ml.) was added to a solution of 2-(2-acetylhydrazino)-3-amino-5-chloropyridine (8.02 g., 0.04 mole) in ethanol (200 ml.) the solution was evaporated under reduced pressure to give a yellow solid. This was recrystallized from ethanol containing a little 6 N ethanolic hydrogen chloride to give a yellow solid, 6.75 g. (77%), M.P. 240° C. (dec.) with darkening from 220° C.

EXAMPLE 28

Preparation of 6-chloro-3-methylpyrido[3,2-e]as-triazine

Ammonium hydroxide (15 ml.) was added to a solution of 6-chloro-1,2-dihydro-3-methylpyrido[3,2-e]-as-triazine hydrochloride (4.38 g., 0.02 mole) in water (50 ml.). A solution of potassium ferricyanide (13.2 g., 0.04 mole) in water (100 ml.) was added immediately, and the mixture extracted with chloroform (4×100 ml.). The combined chloroform extracts were dried over anhydrous magnesium sulfate, filtered and evaporated under reduced pressure. The residue was recrystallized from n-heptane to give orange-red prisms, 2.94 g. (82%) M.P. 127–129° C. A sample was recrystallized for analysis from the same solvent, to give orange-red prisms, M.P. 128.5° C.

EXAMPLE 29

Preparation of 6-carbomethoxy-3-methylpyrido[3,2-e]-as-triazine

A suspension of 6-carbomethoxy-1,2-dihydro-3-methyl-pyrido[3,2-e]-as-triazine hydrochloride (2.09 g. 0.0085 mole) and sodium bicarbonate (4.0 g.) in acetone (200 ml.) was stirred under an atmosphere of nitrogen for 1 hour. The reaction mixture was then filtered to remove inorganic salts, evaporated under reduced pressure and the residue treated with water (50 ml.). To this solution was added a solution of potassium ferricyanide (5.0 g.) in water (20 ml.) followed by concentrated ammonium hydroxide (10 ml.). The mixture was extracted with chloroform (5×50 ml.). The combined chloroform extracts were washed once with water (50 ml.) dried over anhydrous magnesium sulphate and evaporated. The residue was recrystallized from benzene to give red needles. 1.09 g. (71%) M.P. 216–217° C. d. A further recrystallization from benzene gave an analytical sample as red needles, M.P. 217–218° C. d.

EXAMPLE 30

Preparation of 3-methylpyrido[3,2-e]as-triazine-6-carboxylic acid

A solution of potassium hydroxide (0.185 g., 0.0033 mole) in water (3.0 ml.) was added to a solution of 6-carbomethoxy - 3 - methylpyrido[3,2-e]-as-triazine(0.612 g., 0.003 mole) in methanol (3.0 ml.) and the mixture kept at room temperature for 16 hours. The reaction mixture was diluted with water (15 ml.) washed with chloroform (3×15 ml.) carefully acidified with 2 N hydrochloric acid and extracted with ethyl acetate (3×20 ml.). The combined extracts were washed with water, dried over anhydrous magnesium sulfate and evaporated under reduced pressure. The residue was recrystallized from ethyl acetate to give bright red plates, 0.34 g. (60% M.P. 215° C. (dec.).

EXAMPLE 31

Preparation of 6-carbomethoxy-1,2-dihydropyrido[3,2-e]-as-triazine hydrochloride Concentrated hydrochloric acid (5 ml.) was added to a stirred mixture of 3-amino-5-carbomethoxy-2-hydrazinopyridine (9.10 g., 0.05 mole) in triethylorthoformate (30 ml.). The mixture was stirred for 1 hour and the product isolated by filtration and recrystallized from methanol containing a drop of hydrochloric acid to give an orange-yellow solid. 9.1 g. (80%), M.P. 191.5–193° C.

EXAMPLE 32

Preparation of 6-carbomethoxypyrido[3,2-e]-as-triazine

Ammonium hydroxide (10 ml.) was added to a solution of 6-carbomethoxy - 1,2 - dihydropyrido[3,2-e]-as-triazine hydrochloride (6.86 g., 0.03 mole) in water (50 ml.). A solution of potassium ferricyanide (19.8 g., 0.06 mole) in water (100 ml.) was added immediately, and the mixture extracted (4×100 ml.) with chloroform. The combined chloroform extracts were dried over anhydrous magnesium sulfate, filtered and evaporated under reduced pressure. The residue was recrystallized from benzene to give pale red plates, 4.39 g. (77%) M.P. 130.5–131.5° C.

EXAMPLE 33

Preparation of pyrido[3,2-e]-as-triazine-6-carboxylic acid

A solution of potassium hydroxide (0.123 g., 0.0022 mole) in water (2.0 ml.) was added to a solution of 6-carbomethoxypyrido[3,2-e]-as-triazine (0.380 g., 0.002 mole) in methanol (2.0 ml.) and the mixture kept at room temperature for 16 hours. The reaction mixture was diluted with water (10 ml.) washed with chloroform (3×10 ml.), carefully acidified with 2 N hydrochloric acid and extracted with ethyl acetate (3×15 ml.). The combined extracts were washed with water, dried over anhydrous magnesium sulfate and evaporated under reduced pressure. The residue was recrystallized from ethyl acetate to give red-brown plates, 0.193 g. (55%) M.P. 235° C. (dec.).

EXAMPLE 34

Preparation of 3-carbethoxy-1,2-dihydropyrido[3,2-e]-as-triazine hydrochloride

Ethanolic hydrogen chloride (6 N, 20 ml.) was added to a solution of 3-amino-2-(2-ethoxalylhydrazino)pyridine (2.24 g., 0.01 mole) in ethanol (50 ml.). The mixture was heated on a steam-bath for 5 minutes, filtered to remove a small amount of insoluble material and evaporated under reduced pressure. The residue was recrystallized from ethanol to give the hydrochloride (1.81 g., 74%) as red plates M.P. 196–198° C. (dec.).

EXAMPLE 35

Preparation of 3-carbethoxypyrido[3,2-e]-as-triazine

Ammonium hydroxide (10 ml.) was added to a solution of 3-carbethoxy - 1,2 - dihydropyrido[3,2-e]-as-triazine (1.22 g., 0.005 mole) in water (20 ml.). A solution of potassium ferricyanide (3.3 g., 0.01 mole) in water (50 ml.) was added immediately and the mixture extracted with ethyl acetate (5× 50 ml.). The combined extracts were dried over anhydrous magnesium sulfate, filtered and evaporated under reduced pressure. The residue was recrystallized from benzene to give red plates, 0.53 g. (50%), M.P. 187–188° C. (dec.). A sample was recrystallized from benzene for analysis to give red plates, M.P. 188–188.5° C. (dec.).

EXAMPLE 36

Preparation of 3-carbethoxy-1,2-dihydro-1-methylpyrido [3,2-e]-as-triazine hydrochloride Ethanolic hydrogen chloride (6 N, 20 ml.) was added to a solution of 3-amino-2-(2-ethoxalyl-1-methylhydrazino)pyridine (2.38 g., 0.01 mole) in ethanol (50 ml.). After 5 minutes the mixture was evaporated under reduced pressure to give a red solid. Recrystallization from ethanol gave red plates 1.64 g. (64%), M.P. 208° C. (dec.). A sample was recrystallized from ethanol for analysis to give red plates, M.P. 210° C. (dec.).

EXAMPLE 37

Preparation of 2-(2-ethoxalylhydrazino)-3-nitropyridine

To a solution of 2-hydrazino-3-nitropyridine (6.16 g., 0.04 mole) and triethylamine (4.04 g., 0.04 mole) in chloroform (150 ml.) was added dropwise, with stirring, ethoxalyl chloride (5.48 g., 0.04 mole). The reaction mixture was stirred for 1 hour after addition was complete. The chloroform solution was washed with water, dried over anhydrous magnesium sulphate and evaporated under reduced pressure. The residue was recrystallized from benzene to give orange prisms, 7.80 g. (76%) M.P. 105–106° C. A sample for analysis was recrystallized from benzene to give orange prisms, M.P. 106–107° C.

EXAMPLE 38

Preparation of 3-amino-2-(2-ethoxalylhydrazino)pyridine

A solution of 2-(2-ethoxalylhydrazino)-3-nitropyridine (2.54 g., 0.01 mole), (with 0.5 g. 10% palladium-on-carbon as catalyst) in ethanol (100 ml.) was shaken under an atmosphere of hydrogen in a Parr shaker at 34.0 p.s.i. After 5 minutes (theoretical uptake 27 p.s.i.) uptake was 25.0 p.s.i. and steady for 1 minute. Solution was removed, filtered and evaporated under reduced pressure. The residue was extracted with boiling benzene and the benzene solution filtered hot. On cooling a whitish solid was obtained 1.56 g., M.P. 134° C., becoming yellow above ca. 130° C. and on melting becoming semi-solid (liq.>200° C.). A sample was recrystallized for analysis from benzene, filtering hot but without concentrating the solution. The sample formed very fine white needles (electrostatic when dry), M.P. 136.5° C. (yellowing from 130° C. on, semi-solid above M.P., liquifying at ca. 212° C.).

EXAMPLE 39

Preparation of 2-(2-ethoxalyl-1-methylhydrazino)-3-nitropyridine

To a solution of 2-(1-methylhydrazino)-3-nitropyridine (5.04 g., 0.03 mole) and triethylamine (3.03 g., 0.03 mole) in chloroform (100 ml.) was added dropwise, with stirring, ethoxalyl chloride (4.11 g., 0.03 mole). The reaction mixture was stirred for 1 hour after addition was complete. The chloroform solution was washed with water, dried over anhydrous magnesium sulphate and evaporated under reduced pressure. The residue was recrystallized from a 1:1 mixture of benzene and light petroleum, to give pale yellow prisms, 6.10 g. (76%) M.P. 77–78° C. A sample for analysis was recrystallized from the same solvent mixture to give pale yellow prisms, M.P. 79–80° C.

EXAMPLE 40

Preparation of 3-amino-2-(2-ethoxalyl-1-methylhydrazino)pyridine

As in Example 38, uptake after 5 minutes 26.0 p.s.i. and constant (theoretical 27.0 p.s.i.). The hydrogenation mixture was filtered and evaporated under reduced pressure. The residue was crystallized by trituration with ether and then recrystallized using benzene. The product was a white solid, M.P. 89–90° C., 1.79 g.

We claim:

1. A compound selected from the group consisting of those of the formulae:

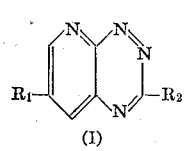 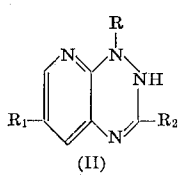

(I)  (II)

wherein R is selected from the group consisting of hydrogen and lower alkyl; $R_1$ is selected from the group consisting of hydrogen, halogen, carboxy and lower carboalkoxy; and $R_2$ is selected from the group consisting of hydrogen, lower alkyl and lower carboalkoxy; and the non-toxic pharmaceutically acceptable acid-addition salts thereof.

2. A compound according to Formula I of claim 1, wherein $R_1$ is methyl and $R_2$ is hydrogen.

3. A compound according to Formula I of claim 1, wherein $R_1$ is chloro and $R_2$ is hydrogen.

4. A compound according to Formula II of claim 1, wherein R is hydrogen, $R_1$ is chloro and $R_2$ is methyl.

5. A compound according to Formula I of claim 1, wherein $R_1$ is hydrogen and $R_2$ is hydrogen.

6. A compound according to Formula II of claim 1, wherein R is hydrogen, $R_1$ is hydrogen and $R_2$ is hydrogen.

7. A compound according to Formula II of claim 1, wherein R is hydrogen, $R_1$ is carbomethoxy and $R_2$ is methyl.

8. A compound according to Formula II of claim 1, wherein R is hydrogen, $R_1$ is carbomethoxy and $R_2$ is hydrogen.

9. A compound according to Formula II of claim 1, wherein R is methyl, $R_1$ is hydrogen and $R_2$ is methyl.

10. A compound according to Formula II of claim 1, wherein R is hydrogen, $R_1$ is hydrogen and $R_2$ is methyl.

References Cited

Wait et al.: J. Mol. Spectry, vol. 19, pp. 25–33 (1966) abstracted in Chemical Abstracts, vol. 64, p. 9073c and 2902 S (1966).

Erickson et al.: "The 1,2,3 and 1,2,4-Triazines, Tetrazines and Pentazines," Interscienece Pub., Inc., New York (1956) pp. 93, 98, 110, 126, and 127.

HENRY R. JILES, Primary Examiner

JOHN M. FORD, Assistant Examiner

U.S. Cl. X.R.

260—295, 295.5, 296, 999; 424—246

UNITED STATES PATENT OFFICE
CERTIFICATE OF CORRECTION

Patent No. 3,549,631                    Dated December 22, 1970

Inventor(s) Benjamin Arthur Lewis and Robert Gordon Shepherd

It is certified that error appears in the above-identified patent and that said Letters Patent are hereby corrected as shown below:

Column 2, line 7, "-carbome-" should read -- -carbo- --
Formula (IV), that portion of the formula reading 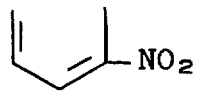 should read 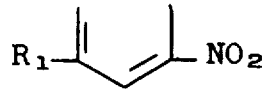

Formula (VI), that portion of the formula reading

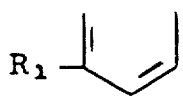 should read 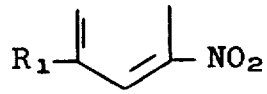

Formula (IIa), that portion of the formula reading 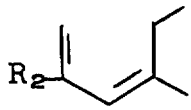 should read 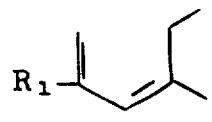

Column 3, line 46, "recrcystallized" should read
-- recrystallized --. Column 6, line 7, "Bacillsu subtilis
ATCC 6638" should read -- Bacillus subtilis ATCC 6633 --.
Table I, under the heading "Compound" the fifth entry
"6-carbomethyxy-" should read -- 6-carbomethoxy- --; under t
heading "Bacteria No. 3" the seventh entry ">125i" should
read -- >250i --. Column 14, line 71, "5-carbomethoypyridin
should read -- 5-carbomethoxypyridine --.

Signed and sealed this 15th day of June 1971.

(SEAL)
Attest:

EDWARD M. FLETCHER, JR.                WILLIAM E. SCHUYLE
Attesting Officer                       Commissioner of Pa